United States Patent
Iftime et al.

(10) Patent No.: US 7,919,155 B2
(45) Date of Patent: Apr. 5, 2011

(54) DOCUMENT AND METHOD OF MAKING DOCUMENT INCLUDING INVISIBLE INFORMATION FOR SECURITY APPLICATIONS

(75) Inventors: Gabriel Iftime, Mississauga (CA); Peter M Kazmaier, Mississauga (CA); Naveen Chopra, Oakville (CA); Matthew T Worden, Fergus (CA); Paul F Smith, Oakville (CA)

(73) Assignee: Xerox Corporation, Norwalk, CT (US)

( * ) Notice: Subject to any disclaimer, the term of this patent is extended or adjusted under 35 U.S.C. 154(b) by 1040 days.

(21) Appl. No.: 11/683,193

(22) Filed: Mar. 7, 2007

(65) Prior Publication Data

US 2008/0220187 A1 Sep. 11, 2008

(51) Int. Cl.
*B44F 1/10* (2006.01)
*G09C 5/00* (2006.01)

(52) U.S. Cl. ............................................. 428/29; 283/91

(58) Field of Classification Search .................. None
See application file for complete search history.

(56) References Cited

U.S. PATENT DOCUMENTS

| | | | |
|---|---|---|---|
| 5,522,921 A | 6/1996 | Custer | |
| 5,807,625 A * | 9/1998 | Amon et al. ............ | 428/195.1 |
| 6,409,998 B1 | 6/2002 | Candau et al. | |
| 6,905,538 B2 | 6/2005 | Auslander | |
| 2004/0007340 A1 * | 1/2004 | Watson ........................ | 162/140 |
| 2004/0233465 A1 | 11/2004 | Coyle et al. | |
| 2007/0119951 A1 | 5/2007 | Auslander et al. | |

FOREIGN PATENT DOCUMENTS

| | | | |
|---|---|---|---|
| EP | 1 681 335 A2 | | 7/2006 |
| GB | 1602755 | * | 5/1978 |
| WO | WO 2006/027418 A1 | | 3/2006 |

OTHER PUBLICATIONS

Office Action dated Dec. 14, 2010 in pending U.S. Appl. No. 12/029,065.
Wikipedia, "Invisible Ink", Sep. 13, 2006, 3 pages.
European Office Action mailed Dec. 16, 2010 in related European Patent Application No. 08151734.4.

* cited by examiner

*Primary Examiner* — Gordon R Baldwin
(74) *Attorney, Agent, or Firm* — Oliff & Berridge, PLC

(57) ABSTRACT

A document includes paper having an average surface roughness of at least about 0.5 microns and including one or more optical brighteners, and includes at least one image thereon wherein the at least one image includes clear binder and light absorbing material that absorbs light only at wavelengths below 350 nm. The image is substantially not detectable to a naked human eye through differential gloss or exposure to light having wavelengths of 365 nm or more, but may be revealed to the naked human eye by exposing the document to light having a wavelength at which the light absorbing material absorbs light.

20 Claims, No Drawings

DOCUMENT AND METHOD OF MAKING DOCUMENT INCLUDING INVISIBLE INFORMATION FOR SECURITY APPLICATIONS

BACKGROUND

Described herein are documents and methods of making and using the same, wherein the document contains a substantially invisible image thereon. The presence of the hidden information is very difficult to detect by persons not knowing that the hidden information is included in the document. Thus, the hidden information is able to remain secure except to persons aware of its presence, and the document can be very difficult to counterfeit, thus making the document advantageously useful in security applications.

An especially difficult task with document security is the creation of documents that contain embedded or hidden information the presence of which is not detectable by the naked human eye. One technique being used is to utilize covert digital encryption in which the information is encoded and printed in encoded format on the document. However, because of the encryption, this technique requires the users to also utilize specially dedicated electronic reader translating software.

Another technique being utilized is to print the information onto the document with clear (colorless) inks that include materials that interact with UV light, for example by fluorescing, so that the information can become visible to the naked human eye upon exposure to the UV light.

For example, U.S. Patent Publication No. 2004/0233465 describes an article marked with image indicia for authentication, information, or decoration by providing a plurality of inks having a plurality of fluorescence colors when exposed to excitation energy, separating colors of the image indicia into a plurality of image levels in accordance with the fluorescence colors of the inks, and printing each image level in mutual registration on the article using the corresponding ink. The image printed with each ink may be substantially invisible under illumination within the visible spectrum. The invisibly printed images have multiple authentication features, including the use of covert UV-fluorescent materials, IR-fluorophores, microparticles, and other chemical taggants.

U.S. Pat. No. 5,807,625 describes photochromic printing inks that are used for the printing of security documents. Prints are normally nearly colorless and become colored when energy irradiated, such as by ultraviolet light. This photocoloration is reversible. The printing inks contain photochromic compounds which are protected against other ink components. Methods are described to prepare the inks, to print security documents, and to detect counterfeiting.

However, several problems may be encountered with the above technique. First, the clear ink used to form the hidden information may have a differential gloss from the document substrate, typically paper, and thus the naked human eye could detect that something is present on the document. A counterfeiter could then investigate further to reveal the hidden information. Second, even if no differential gloss were evident, the hidden information may still be revealed with the use of a simple black light, and counterfeiters knowing of the prevalent use of UV absorbing inks often will check a document under black light.

What is still required is a simple method of embedding hidden information or images into a document such that the information is substantially undetectable to the naked human eye due to differential gloss, and which is further not detectable or revealed by black light.

SUMMARY

The documents and methods described herein are suitable for fulfilling one or more of the above needs. These and other advantages of the documents and methods, as well as additional inventive features, will be apparent from the following description.

Described is a document comprising a paper substrate having an average surface roughness of at least about 0.5 microns and including one or more optical brighteners, wherein the paper substrate includes at least one image thereon, and wherein the at least one image is comprised of clear binder and a light absorbing material that absorbs light only at wavelengths below 350 nm.

Also described is a document comprising a paper substrate including one or more optical brighteners, wherein the paper substrate includes at least one image thereon that is invisible to a naked human eye under light having wavelengths of 365 nm or more but visible to a naked human eye under light having wavelengths below 350 nm, and wherein such at least one image is comprised of clear binder and light absorbing material that absorbs light only at wavelengths below 350 nm.

Further, described is a method of forming a document with at least one image on a paper substrate, wherein the at least one image is substantially not detectable to a naked human eye through differential gloss or exposure to light having wavelengths of 365 nm or more, the method comprising providing a paper having an average surface roughness of at least about 0.5 microns and including one or more optical brighteners, and forming the at least one image on the paper with a liquid ink including clear binder and light absorbing material that absorbs light only at wavelengths below 350 nm.

In embodiments, advantages of the documents and methods described herein include that information may be formed on the paper substrate in a manner substantially not detectable to a naked human eye through differential gloss or exposure to light having wavelengths of 365 nm or more, and thus not detectable under most common conditions used by counterfeiters, but which information can be exposed to a viewer aware of the hidden information in the document through exposure of the document to light having a wavelength at which the light absorbing material absorb the light.

EMBODIMENTS

Documents herein include a paper substrate that includes one or more optical brighteners and further includes at least one image thereon that is invisible to a naked human eye under light having wavelengths of 365 nm or more but visible to a naked human eye under light having wavelengths below 350 nm.

As the paper substrate, any suitable paper substrate may be used. However, in embodiments where it is desired to achieve an image containing hidden information therein that is substantially not detectable as the result of any gloss differential between the paper and the image, paper substrates having a sufficient surface roughness and/or porosity may be selected. For example, papers with sufficient surface roughness and porosity can permit the colorless ink used to form the hidden information image to blend and penetrate into the paper such that no gloss differential results.

Surface roughness refers to when the surface of the paper substrate is characterized by microscopic peaks and valleys. The surface roughness of the substrate surface may be measured by observation through a microscope, by optical interferometry, or by measuring the movements of a stylus dragged over the surface. Typical roughness values, which reflect the distances between peaks and valleys of the substrate surface, may range from several microns to tens of microns. For avoiding differential gloss in the hidden information image, a paper substrate having a surface roughness of at least about 0.5 microns, for example from about 1 microns to about 20 microns or from about 2 microns to about 20 microns, may be used. For paper substrates having the aforementioned surface roughness, the paper substrates are typically substantially free of any surface coatings thereon, for example gloss coatings, which may act to reduce the surface roughness and/or reduce the ability of an ink to penetrate into the paper substrate surface.

In addition, the paper substrate may also desirably have a sufficient porosity so as to permit the ink, for example a liquid ink, to penetrate somewhat into the paper substrate. This result also appears to assist in the avoidance of differential gloss. The porosity of the substrate may be measured by, for example, air bleed through the substrate, in units of time per volume of air, or by the absorption rate of fluid into the substrate, in units of volume of fluid per unit of time. For avoiding differential gloss in the hidden information image, a paper substrate having a porosity of about 100 milliliters per minute to about 2,000 milliliters per minute, such as from about 100 milliliters per minute to about 1,500 milliliters per minute or from about 200 milliliters per minute to about 1,500 milliliters per minute, may be used. Typically, uncoated paper has a porosity of from about 500 to about 1,500 milliliters per minute.

Commercially available papers having the above surface roughness and porosity values include, for example, Xerox 4024 and 4200 paper. For example, Xerox 4200 paper has a surface roughness of about 2.5 microns.

The purpose of optical brighteners in the paper is typically to remove the yellowish appearance of the raw materials. Optical brighteners increase the brightness of the paper so that a white paper appears even whiter, for example by increasing the intensity of reflected blue light. Optical brighteners typically act to increase whiteness by converting UV light to blue light.

The function of the optical brighteners to emit blue light is utilized in the documents herein. For example, when the document is exposed to light having wavelengths of less than 350 nm, for example less than 300 nm and/or less than 255 nm, the optical brighteners emit blue light. Where the ink is made to include materials that do not absorb at wavelengths above 350 nm, the appearance of the document is not changed upon exposure to such light. Thus, under black light (365 nm), the document has the same appearance and the hidden information is not displayed. However, when the wavelength of the exposing light is less than 350 nm, and more specifically at the wavelength at which a material of the ilk absorbs the light, the material will then block light from reaching the optical brightener, and thus no blue light will be emitted at such locations. As a result, the hidden information will become visible to a naked human eye under these light viewing conditions. The optical brighteners in the paper are thus used in the hiding and exposing of the hidden information printed on the paper substrate.

As optical brighteners, any optical brighteners, organic or inorganic, that emit blue light upon exposure to a broad range of light wavelengths may be used. For example, the optical brightener may emit blue light across a range of from about 100 nm to about 800 nm, such as from about 100 nm to about 700 nm or from about 200 nm to about 500 nm. Examples of typically optical brighteners that may be employed include colloidal silicas, titanium dioxide (for example Rutile or Anatase), hydrated alumina (for example Hydrad), barium sulfate (for example K. C. Blanc Fix HD80, calcium carbonate, high brightness clays (for example Engelhard Paper Clays), Dow plastic pigment (for example 722, 788 Dow Chemicals), calcium silicate, insoluble cellulosic materials (for example from Scientific Polymer Products), tetrasulfonated optical brighteners, for example benzenesulfonic acid, 2,2'-(1-2-ethenediyl)bis[5-[[4-bis(2-hydroxyethyl)amino]-6-[(4-sulfophenyl)amino]-1,3,5-triazin-2-yl]amino]-tetrasodium salt (for example from Ciba Specialty Chemicals Corporation), stilbenes, fluorescent agents, and the like. The optical brighteners may be present in the paper substrate in an amount of from about 1 to about 60 percent by weight of the paper substrate.

The portion of the image printed onto the paper substrate that includes the information substantially not detectable to the naked human eye under normal light conditions is comprised of at least clear binder and light absorbing material that absorbs light only at wavelengths below 350 nm. Of course, the document can, and most typically will, include other visible images (that is, visible to a naked human eye under normal visible light conditions, for example visible at wavelengths of light of 365 nm or more) in addition to the hidden text images.

As the clear binder, and binder material, including oligomeric or polymeric materials, may be used as long as the binder material also does not absorb light having a wavelength of more than 350 nm. More desirably, the binder material should not absorb light having a wavelength or more than 300 nm or more than 255 rim. In this way, the binder material also will not be detectable under normal or black light conditions. Examples of suitable binder materials include, for example, polyacrylates or polymethacrylates such as polymethyl methacrylate, polystyrenes, and polyolefins such as polyethylene, which do not absorb at wavelengths higher than 250 rim. Additional suitable binder materials include polycarbonates, polysulfones, polyethersulfones, polyarylsulfones, polyarylethers, polyvinyl derivatives, cellulose derivatives, polyurethanes, polyamides, polyimides, polyesters, silicone resins, epoxy resins and the like. Copolymer materials such as polystyrene-acrylonitrile, polyethylene-acrylate, vinylidenechloride-vinylchloride, vinylacetatevinylidene chloride, and styrene-alkyd resins are also examples of suitable binder materials. The copolymers may be block, random, or alternating copolymers.

The binder may be composed of one, two, three or more different binders. When two or more different binders are present, each binder may be present in an equal or unequal amount by weight ranging, for example, from about 5% to 90%, such as from about 30% to about 50%, based on the weight of all binders.

As the light absorbing material that absorbs light only at wavelengths below 350 nm, any absorbing material that absorbs light at wavelengths below 350 nm, and desirably below 300 nm or below 255 nm, may be used. 365 nm represents black light, and thus it is desired that the light absorbing material not absorb light above or near this wavelength of light. The light absorbing material, which may be organic or inorganic, is also desirably colorless so as not to be detectable to a naked human eye under normal light conditions. The light absorbing material is desirably not fluorescent.

Examples of the light absorbing material include organic molecules such as, for example, hydroxybenzophenones, hydroxybenzotriazoles, oxanilides, triazines and hindered amine light stabilizers. An example oxanilide is TINUVIN 312 available from Ciba that absorbs light at wavelengths below 350 nm, but does not absorb at wavelengths higher than 350 nm.

Examples of inorganic light absorbing materials include inorganic nanoparticles. The nanoparticles may have an average particle size of about 300 nm or less, for example of from about 1 nm to about 300 nm or from about 10 nm to about 200 nm. The average size of the nanoparticles may be determined via any suitable technique and device, for example via use of a Malvern Zeta-sizer, a Brookhaven nanosize particle analyzer or similar device. Examples of inorganic nanoparticles include, for example, titanium dioxide, aluminum oxide, silicon dioxide, zinc oxide, combinations thereof and the like. These inorganic materials must be of the nanoparticle size in order for the material to be transparent to the naked human eye. A size above 300 nm makes titania appear white, which is not desirable as there may be a detectable difference in white color between the nanoparticles and the paper substrate.

The nanoparticles may be commercially available, for example from Sigma-Aldrich. Alternatively synthetic procedures for making nanoparticles have been reported in the literature. For example, titanium dioxide nanoparticles may be obtained by hydrolysis of titanium tetrachloride in aqueous hydrochloric acid solution. Another procedure starts from tetrabutyl titanate that is hydrolyzed in anhydrous ethanol in the presence of hydrochloric acid as a catalyst. Zinc oxide may be obtained starting from zinc chloride powder.

The nanoparticles may need to be functionalized in order to be dispersible in the marking material composition. Suitable functional groups present on the surface of the nanoparticles for compatibility with marking material vehicles may include, for example, long linear or branched alkyl groups, for example from about 1 carbon atom to about 150 carbon atoms in length, such as from about 2 carbon atoms to about 125 carbon atoms or from about 3 carbon atoms to about 100 carbon atoms. Other suitable compatibilizing groups include esters, ethers, amides, carbonates and the like. A review on the subject of surface functionalizing inorganic particles may be found in Kohji Yoshinaga, Ch. 12.1, Surface modification of inorganic particles, in Surfactant Science Series (2000), p. 626-646.

The light absorbing material may be included in the marking material in an amount of from, for example, about 0.1% to about 40% by weight, such as from about 1% to about 25% by weight or from about 2% to about 10% by weight, of the marking material.

Te image is desirably formed by printing, for example by ink jetting or any other suitable method for applying a marking material to a substrate, a marking material comprising the clear binder and the light absorbing material. In embodiments, the clear binder and light absorbing material are in a liquid marking material, for example dispersed in a liquid vehicle. As the liquid vehicle of the marking material, any suitable vehicle presently known in the art or that may become known in the future may be used. Example liquid vehicles include a liquid with an effective viscosity of, for example, from about 0.5 to about 500 centipoise, such as from about 1 to about 20 centipoise. Specific examples include hexane, toluene, ISOPAR or a polymer such as polyacrylic acid or polyvinyl alcohol. The liquid may be a branched chain aliphatic hydrocarbon. A nonpolar liquid of the ISOPAR series, comprised of isoparaffinic hydrocarbon fractions and manufactured by the Exxon Corporation, may be used. Additional commercially available hydrocarbon liquids that may be used include, for example, the NORPAR series available from Exxon Corporation, the SOLTROL series available from the Phillips Petroleum Company, and the SHELLSOL series available from the Shell Oil Company.

The amount of the liquid employed in the marking material may be, for example, from about 30 to about 99.9%, for example from abut 50 to about 99%, by weight of the total marking material. The total solids of the liquid marking material may be from, for example, about 0.1 to about 70% by weight, such as from about 0.3 to about 50% by weight, of the marking material.

The use of a liquid vehicle and a porous paper substrate as discussed above allows the ink to penetrate into the paper substrate instead of being present as a film or coating on the substrate as when toner or solid inks are used. This avoids differential gloss, making the image formed from the liquid marking material substantially undetectable to the naked human eye. Moreover, the penetration into the substrate makes it nearly impossible for one to be able to remove the image from the paper substrate without damaging or destroying the substrate.

The liquid marking material may include materials besides the clear binder, light absorbing material and liquid vehicle. However, it is here again desired that any additional components included in the marking material not absorb light at wavelengths greater than 350 nm.

A method of forming the documents having the at least one image on a paper substrate that is substantially not detectable to a naked human eye through differential gloss or exposure to light having wavelengths of 365 nm or more includes providing a paper substrate as discussed above and forming the at least one image on the paper with the liquid marking material discussed above. Again, the formation of the image may be done via any suitable marking procedure in the art. Prior to the curing or drying of the marking material, which results in substantially complete to complete removal of the liquid vehicle from the paper substrate, the liquid marking material penetrates into the paper substrate.

For detection, the document must be exposed to light having a wavelength at which the light absorbing material absorbs, which light is below 350 nm as detailed herein. An authorized holder of the document will know the wavelength of the light for this absorption, and may possess equipment designed to emit only this specific wavelength of light (although such is not necessary). Exposure of the document to the wavelength of light at which the light absorbing material absorbs light will result in the image becoming visible to the naked human eye. As detailed above, this is because the light absorbing material will absorb the incoming light, creating a differential between the marking and the paper substrate that renders the image visible. Removal of the document from this light condition will result in the image again becoming substantially undetectable to the naked human eye.

As mentioned above, other visible images may be included on the document. The visible and invisible images may share a same portion of the document, or the invisible image portion may be in a separate portion of the document for easy location by an authenticator. Any ink or toner capable of forming visible images on a paper substrate may be used without limitation. The visible and invisible portions of the document may be formed at the same or different times in the creation of the document.

Advantages of the documents and methods herein thus include that the invisible image formed on the document cannot be viewed at all under normal or black light conditions, that the process is cost effective and does not require encryption, that the image cannot be copied using any presently available equipment or copiers, that the invisible image cannot be easily removed from the paper substrate, and that the wavelengths at which the light absorbing materials absorb light may be tuned to allow customization of the security features for different customers.

Embodiments will now be further illustrated by way of the following example.

Functionalized nanoparticle synthesis—40 g of oleic acid was degassed under vacuum at 50° C. and then was heated at 90° C. under argon. 8 mL of titanium tetraisopropoxide (TTIP) was added and allowed to mix for 5 minutes. 8 mL of tetramethylammonium hydroxide (TMAH) was added to the mixture and heating and stirring was continued for 16 hours. The mixture was allowed to cool down to 50° C. Excess water was evaporated under vacuum, and the mixture then cooled to room temperature. The mixture was poured into 300 mL of ethanol in an Erlenmeyer flask. A white solid precipitated immediately. The mixture was centrifuged for 5 minutes at 3,000 rpm, and about 8 g of white solid particles was collected. The particles were dispersible in organic solvents including hexane, ISOPAR and toluene, providing a clear solution in each case. The particles had an average particle size of about 15 nm as measured with a Malvern Zeta-sizer.

Ink composition preparation—A liquid composition was fabricated by mixing 200 mg of the above titania nanoparticles into 5 ml of a 5% solution of polymethyl methacrylate (PMMA) in toluene. A clear and transparent solution resulted.

Document preparation—The above ink composition was applied by hand brush to a Xerox 4024 paper substrate. Under room light conditions, the image was not revealed or detected. Under 365 nm black light conditions, the image still was not revealed or detected. However, upon exposure to 254 nm wavelength light, the image was revealed.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A document, comprising a paper substrate having an average surface roughness of at least about 0.5 microns and including one or more optical brighteners, wherein the paper substrate includes at least one image thereon that is invisible to a naked human eye under light having wavelengths of 365 nm or more but visible to a naked human eye under light having wavelengths below 350 nm, wherein the at least one image is comprised of clear binder and a light absorbing material that absorbs light only at wavelengths below 350 nm, and wherein the light absorbing material that absorbs light only at wavelengths below 350 nm is not colored and is not fluorescent.

2. The document according to claim 1, wherein the paper substrate further includes at least one additional image thereon that is visible to a naked human eye under light having wavelengths of 365 nm or more.

3. The document according to claim 1, wherein the paper substrate has an average surface roughness of from about 1 micron to about 20 microns.

4. The document according to claim 1, wherein the paper substrate has an average porosity of from about 100 to about 2,000 milliliters per minute.

5. The document according to claim 1, wherein the paper substrate is substantially free of any gloss surface coating thereon.

6. The document according to claim 1, wherein the clear binder is polymethyl methacrylate, polystyrene, polyethylene, polycarbonates, polysulfones, polyethersulfones, polyarylsulfones, polyarylethers, polyvinyl derivatives, cellulose derivatives, polyurethanes, polyamides, polyimides, polyesters, silicone resins, epoxy resins or mixtures of the foregoing.

7. The document according to claim 1, wherein the clear binder does not absorb light at wavelengths above 350 nm.

8. The document according to claim 1, wherein the light absorbing material that absorbs light only at wavelengths below 350 nm absorbs light only at wavelengths below 300 nm.

9. The document according to claim 1, wherein the light absorbing material that absorbs light only at wavelengths below 350 nm comprises nanoparticles having an average particle size of 300 nm or less.

10. The document according to claim 9, wherein the nanoparticles are zinc oxide, silica, alumina or titania.

11. The document according to claim 1, wherein the light absorbing material that absorbs light only at wavelengths below 350 nm is an organic material.

12. The document according to claim 11, wherein the organic material is a hydroxybenzophenone, a hydroxybenzotriazole, an oxanilide or a triazine.

13. The document according to claim 1, wherein the one or more optical brighteners emit blue light across a range of from about 100 nm to about 800 nm.

14. The document according to claim 1, wherein the ink is applied as a liquid and penetrates into the paper substrate.

15. A document comprising a paper substrate including one or more optical brighteners, wherein the paper substrate includes at least one image thereon that is invisible to a naked human eye under light having wavelengths of 365 nm or more but visible to a naked human eye under light having wavelengths below 350 nm, wherein such at least one image is comprised of clear binder and a light absorbing material that absorbs light only at wavelengths below 350 nm, and wherein the light absorbing material that absorbs light only at wavelengths below 350 nm is not colored and is not fluorescent.

16. The document according to claim 15, wherein the paper substrate further includes at least one additional image thereon that is visible to a naked human eye under light having wavelengths of 365 nm or more.

17. The document according to claim 15, wherein the clear binder does not absorb light at wavelengths above 350 nm.

18. The document according to claim 15, wherein the light absorbing material that absorbs light only at wavelengths below 350 nm absorbs light only at wavelengths below 300 nm and comprises nanoparticles having an average particle size of 300 nm or less.

19. The document according to claim 15, wherein the light absorbing material that absorbs light only at wavelengths below 350 nm is zinc oxide, silica, alumina, titania, a hydroxybenzophenone, a hydroxybenzotriazole, an oxanilide or a triazine.

20. A document, comprising a paper substrate having an average surface roughness of at least about 0.5 microns and including one or more optical brighteners, wherein the paper substrate includes at least one image thereon that is invisible to a naked human eye under light having wavelengths of 365 nm or more but visible to a naked human eye under light having wavelengths below 350 nm, wherein the at least one image is comprised of clear binder and a light absorbing material that absorbs light only at wavelengths below 350 nm, and wherein the at least one image becomes visible to a naked human eye under light having wavelengths below 350 nm only by the light absorbing material absorbing light at wavelengths below 350 nm at locations of the at least one image to block light from reaching the one or more optical brighteners at the locations such that the one or more optical brighteners do not emit blue light at the locations.

* * * * *